US005217255A

United States Patent [19]

Lin et al.

[11] Patent Number: 5,217,255

[45] Date of Patent: Jun. 8, 1993

[54] ERASABLE SYSTEM INCLUDING MARKING SURFACE AND ERASABLE INK COMPOSITION

[76] Inventors: Nan J. Lin, 6 Shea Cir., Burlington, Mass. 01803; Peter G. Hanley, 29 Highland St., Milford, Mass. 01757

[21] Appl. No.: 287,506

[22] Filed: Dec. 19, 1988

Related U.S. Application Data

[63] Continuation of Ser. No. 906,867, Sep. 15, 1986, abandoned.

[51] Int. Cl.[5] .......... B42D 1/00; B32B 3/00; C09K 3/00

[52] U.S. Cl. .......... 281/15.1; 106/23B; 106/32; 106/32.5; 270/37; 270/53; 281/51; 428/207; 428/308.8; 428/321.3; 428/327; 428/511

[58] Field of Search .......... 270/37, 53; 524/525, 524/543, 270; 428/207, 511, 308.8, 321.3, 327; 106/23, 32, 32.5; 281/15.1, 51

[56] References Cited

U.S. PATENT DOCUMENTS

| | | | |
|---|---|---|---|
| 2,852,398 | 9/1958 | Goessling | 106/32 |
| 3,875,105 | 4/1975 | Daugherty et al. | 524/543 |
| 3,949,132 | 4/1976 | Seregely et al. | 428/207 |
| 4,130,691 | 12/1978 | Canard et al. | 428/511 |
| 4,297,260 | 10/1981 | Ferree, Jr. et al. | 523/161 |
| 4,389,499 | 6/1983 | Riesgraf | 524/525 |
| 4,410,170 | 10/1983 | Wertheimer et al. | 270/37 |
| 4,861,644 | 8/1989 | Young et al. | 428/207 |

*Primary Examiner*—P. C. Sluby
*Assistant Examiner*—Hoa T. Le
*Attorney, Agent, or Firm*—Fish & Richardson

[57] ABSTRACT

An erasable system including an element having a porous marking surface and an erasable marking composition for applying markings to the porous marking surface. The marking composition comprises an aqueous dispersion of particles of film-forming polymeric materials and a colorant, and the marking composition provides an erasable, substantially water-insoluble coalesced residue on the marking surface.

19 Claims, No Drawings

ERASABLE SYSTEM INCLUDING MARKING SURFACE AND ERASABLE INK COMPOSITION

This application is a continuation of application Ser. No. 906,867, filed Sep. 15, 1986 now abandoned.

BACKGROUND OF THE INVENTION

1. The Field of the Invention

This invention relates to novel, improved erasable systems including a marking element providing a marking surface and erasable marking compositions for applying markings to such surfaces.

2. Description of the Prior Art

Erasable systems including a marking element carrying or providing a marking surface and an erasable ink marking composition for applying markings to the marking surface are known to the art. Essentially, such known systems include a marking element comprising a substrate carrying an impervious or substantially non-porous marking surface and an erasable ink marking composition for applying markings to the surface which can be erased from the surface by wiping the surface with a dry eraser such as a cloth or paper tissue. The idealized combination of performance characteristics for known erasable systems has been reasonably well defined. The defined desired combination of performance characteristics for a marking element includes the capability of the marking surface to effectively receive, retain, and display applied marking composition until the received marking is erased from the surface without leaving any significant residual visible evidence of the received marking. Additionally, the desired combination of performance characteristics for marking compositions of erasable systems includes the capability of the marking composition to deposit uniform, visible markings on the surface which can dry rapidly to provide a film or coalesced residue which can be substantially completely erased from the marking surface without leaving any remaining evidence of colorants or other ingredients of the marking composition on the surface.

A known erasable system is disclosed in commonly assigned U.S. Pat. Nos. 3,834,823 and 3,949,132. The erasable system disclosed in these patents includes a marking element carrying a smooth, hard, virtually impervious marking surface such as a hard, plastic surface. The erasable marking composition of the disclosed system is included in a writing instrument having a porous point such as a felt point or a point composed of synthetic or natural fibers bound together to provide capillary channels. Essential ingredients of the erasable marking composition include a release agent having a very low vapor pressure, water, a colorant which is soluble in the water but insoluble in the release agent and a silicone surfactant which is soluble in the marking composition. Additional ingredients which may be included in the marking composition are a water-soluble wax and a water-miscible organic solvent.

In practice, the marking composition is applied to the marking surface and during evaporation of the aqueous or partially aqueous solvent, the release agent comes out of solution and forms a film on the marking surface. Accordingly, on drying, the trace or line provided by the marking composition includes colorants which are insoluble in the release agent, and the colorants lie on top of the thin film of release agent. In this way the film of release agent provides a barrier between the film and the marking surface so that the film can be erased from the surface without leaving any residual visible evidence of the marking on the surface.

U.S. Pat. No. 3,563,782 describes another known erasable system in which the marking surface is the surface of a Pigmented plastic substrate, and the erasable marking composition consists of a dispersion of dye particles in a solvent having a low surface tension. The marking composition is applied to the marking surface, and after evaporation of the solvent, an erasable, non-continuous film is provided on the marking surface and the film includes discrete, closely spaced dye particles. The non-continuous film of dye particles can be erased from the marking surface by wiping the film with a cloth or soft paper.

The erasable systems described above are especially adaptable for use as substitutes for blackboards, and the marking element usually takes the form of a relatively large panel. Moreover, the markings provided on the marking surface of the above-described erasable systems have little rub resistance so that the markings can be completely erased from the surface by a dry cloth or felt eraser to provide a clean marking surface on the marking element. Known erasable systems providing markings on a marking surface having good rub resistance require cloths or paper wet with water or solvent to effectively remove such markings and provide a clean surface for new markings. The use of wet cloths or paper obviously complicates the achievement of a clean surface for new markings.

Additionally known erasable systems are not so easily or readily adaptable for use in office or desk paraphernalia such as daily calendars or desk notebooks designed to record appointments, schedules, accounts, or similar notations. An erasable system for use in such paraphernalia requires significantly different performance characteristics from those required for erasable systems used as substitutes for blackboards. For example, such paraphernalia is normally designed for individuals for recording desired notations useful to the individual. Accordingly, the size of the marking element needed is relatively small, and preferably, the element should be relatively flexible and have qualities and properties more closely corresponding to paper rather than to plastics. Moreover, the marking composition should be capable of reliably providing legible markings in relatively small areas of the marking surface. Also, the markings should have sufficient rub resistance so that they are not inadvertently erased such as by accidental rubbing or wiping or abrasion of the surface. The degree of rub resistance of the marking is particularly important in such paraphernalia involving a plurality of marking elements superposed on each other and where one or more of the elements has erasable markings on the marking surface. Ideally, the marking should be mechanically erasable by an elastomeric eraser rather than by a cloth or paper or the like. In this way, the marking can be effectively retained on the marking surface until it is no longer needed, and markings in selected areas can be completely and neatly erased without affecting markings in non-selected areas.

The present invention presents to the art novel, improved erasable systems having an especially desirable combination of performance characteristics which provide sufficient flexibility and latitude so that the systems are adaptable for use as a substitute for blackboards and also are especially adaptable for providing the above-described desk or office paraphernalia.

BRIEF SUMMARY OF THE INVENTION

The novel, improved erasable systems of this invention include a marking element carrying a marking porous surface and an erasable marking composition comprising a dispersion of a particulate film-forming material(s) and a colorant. Marking elements of this invention may comprise a plastic, ceramic, fibrous or paper substrate carrying a porous marking surface. In accordance with the present invention, the ratio of the average pore diameter of the pores of the porous marking surface to the average particle diameter of the particulate film-forming material is maintained at less than about 20 to assure substantially complete erasure of erasable markings on the marking surface. In the preferred practice of the invention, the erasable marking composition provides markings on the marking surface which are completely erasable by an elastomeric eraser.

DESCRIPTION OF THE PREFERRED EMBODIMENTS

The presently contemplated preferred erasable systems of the invention comprise a marking element having a porous marking surface carried on a fibrous or paper substrate and an erasable marking composition comprising a dispersion of a particulate film-forming polymeric material and a colorant. The essential feature of marking elements of erasable systems of the present invention is that the ratio of the average surface pore diameter of the porous marking surface to the average particle diameter of the particulate film-forming polymeric material dispersed in the marking composition is 20 or less. Especially preferred marking elements are those in which the ratio is "average surface pore diameter" means that the greater number of pores on the surface have or closely approximate the recited average pore diameter although the surface may include a lesser number of pores having a diameter smaller or greater than the recited average pore diameter. The average surface pore diameter recited in the following description of the invention were measured by a continuous scanning mercury porosimeter (Quantachrome Corporation, Model Autoscan-60) according to the procedure described in ASTM Test C 699.

Marking elements of the invention can comprise a fibrous or paper substrate carrying a porous marking surface having an average surface pore diameter between about 0.01 to about 10.0 microns. Especially preferred marking elements presently contemplated are those carrying a porous surface having an average surface pore diameter between about 0.05 to about 1.0 microns. The especially preferred marking elements of the present invention are commercially available and can be prepared by treating a surface of a selected fibrous or paper substrate with a material which can coat or impregnate the surface to reduce the average surface pore diameter of the porous surface. For example, papers having a porous surface providing an average surface pore diameter between about 2 to about 4 microns can be coated with or immersed in various materials such as dispersions of polymeric materials which can coat or impregnate the porous paper surface to thereby reduce the average surface pore diameter of the porous surface to between about 0.05 to about 0.75 microns. Many materials capable of reducing the average surface pore diameter of papers are known to those skilled in the paper-making art. Such known materials include dispersions of a polymeric material(s) and a finely divided, particulate pigment(s) and normally the polymeric material has some degree of adhesive and/or film-forming properties. Pigments used in such known materials include clays, titanium dioxides calcium carbonates, aluminum oxide dihydrates, satin whites barium sulfates and silicas, among others. Polymeric materials used in such known materials include animal glues, caseins, alpha proteins, starches, polyvinylalcohols and various natural and synthetic polymeric elastomeric latexes. Table 1 below lists some of the commercially available papers representative of the especially preferred marking elements useful in the invention.

TABLE 1

| Paper | Source |
|---|---|
| WARREN LUSTRO | S. D. Warren Co., Boston, Mass. |
| WARREN CAMEO DULL | S. D. Warren Co., Boston, Mass. |
| WARREN WARRENFLOW | S. D. Warren Co., Boston, Mass. |
| WARREN PATINA | S. D. Warren Co., Boston, Mass. |
| IKONOLUX DULL IVORY | Zanders Feinpapieri AG, W. Germany |
| IKONOLUX MATTE DULL | Zanders Feinpapieri AG, W. Germany |
| CARTER RICE PALOMA | Consolidated Paper Inc., Chicago, IL |

Erasable marking compositions of erasable systems of the present invention comprise an aqueous or partially aqueous dispersion of a particulate, film-forming polymeric material and a colorant. Broadly, the preferred particulate, film-forming polymeric materials useful in the practice of this invention are in the form of latexes or dispersions or suspensions of polymeric particles in water which provide a substantially water-insoluble polymeric film or polymeric residue when dry. Accordingly, useful polymeric materials include latexes of olefinic polymers including polymers and copolymers of unsaturated hydrocarbons, unsaturated hydrocarbon acids, unsaturated hydrocarbon alcohols, unsaturated hydrocarbon aldehydes and unsaturated hydrocarbon ketones. Other useful polymeric materials include copolymers of olefins and diolefins, and condensation polymers such as polyesters, polyethers, polyamines, polyamides, and polyurethanes. Preferred polymeric materials are those including the polymerized residue of such monomers as acrylonitrile, butadiene, chloroprene, isoprene, vinyl alcohol, alkyl acrylates, alkyl methacrylates, styrene, vinyl acetate, vinyl chloride, vinylidene chloride, saturated or unsaturated diols or polyols, saturated or unsaturated dicarboxylic acids or esters, diisocyanates, and derivatives and mixtures of these monomers.

Especially preferred polymeric materials include copolymers of styrene such as styrene-butadiene, styrene-isoprene, and styrene-ethylene butylene copolymers and copolymers of acrylonitriles, especially carboxylated acrylonitriles.

The average particle diameter of particulate, film-forming polymeric materials in commercial latexes presently available is between about 0.04 to about 0.5 microns. For the purposes of this invention "average particle diameter" means that the greater number of the film-forming polymeric particles in the latex dispersion have or closely approximate the average particle diameter recited although a lesser number of polymeric particles dispersed in the latex may have a particle diameter greater or larger than the average particle size recited. Average polymeric particle diameter referred to in this description were measured by a Coulter Counter N4.

Especially preferred latexes for use in the practice of the invention are those in which the dispersed particles have an average particle diameter between about 0.05 to about 0.3 microns. The maximum average particle size of dispersed particulate film-forming polymeric materials in latexes which are presently commercially available is about 0.5 microns. Accordingly this factor presently limits the useful marking elements to those having an average surface pore diameter of no greater than about 10 microns. However, latexes of film-forming polymeric materials having an average particle diameter greater than 0.5 microns have been produced in small quantities, and commercially feasible techniques may be developed for producing latexes of film-forming, polymeric materials having an average particle diameter greater than 0.5 microns. Such a development should permit the use of marking elements having a larger average surface pore size since the essential feature of erasable systems of the present invention is that the ratio of the average surface pore diameter of the marking element to the average particle diameter of the polymeric material of the marking composition is 20 or less.

The amount and type of particulate film-forming polymeric material selected for use in marking compositions of the invention must be effective to provide a substantially water-insoluble, erasable film or coalesced residue on the marking surface when dry. Additionally, the dry film or coalesced residue should not undergo rapid cure or other changes which would impair the erasability of the film so that the film remains erasable over an extended period of time. At the same time, the erasable film must exhibit sufficient rub resistance and/or adherence to the porous surface and sufficient integrity so that the film is not erased from the porous surface by inadvertent light rubbing of the film. The especially preferred marking compositions provide erasable films having a degree of erasability permitting the film to be erased in response to the action of elastomeric erasures, and the preferred films retain such a degree of erasability for a period of time up to about six months or longer. Moreover, preferred marking compositions provide erasable films which can effectively coat or encapsulate or otherwise retain the colorant(s) and other ingredients associated with the film to prevent migration of colorant and other ingredients from the film to the porous surface so that erasure of the film removes effectively all colorant and other ingredients associated with the film without leaving any visible residue of film on the porous surface. Useful amounts of preferred polymeric film-forming materials such as the copolymers of styrene and acrylonitrile mentioned before are between about 3 to about 70 percent by weight polymeric material based on the total weight of the marking composition, and most preferably, the amount of polymeric material is between about 10 to about 60 percent by weight.

Colorants useful in marking compositions of erasable systems of the present invention are those which are substantially water insoluble when the erasable film of polymeric particles and colorant is dry. Accordingly, suitable colorants include water-insoluble colorants or colorants which can be rendered water insoluble upon drying by chemical and/or Physical mechanisms or colorants which can be rendered water insoluble by reason of a physical and/or chemical retention mechanism existing between the polymeric particles and colorants of the erasable film. Preferred colorants include commercially available colorants such as COLANYL BLUE A2R (American Hoechst), CRYSTAL VIOLET (BASF Wyandette), and ECCOBRITE BLUE (Eastern Chemical) among others. Preferred amounts of the above colorants include amounts between about 0.1 to about 40 percent by weight colorant(s) based on the total weight of the marking composition and especially preferred amounts are between about 0.3 to about 15 percent by weight.

Water is the essential dispersant in marking compositions of the invention, and the amount of water in the marking compositions can vary but preferred marking compositions include from about 20 to about 90 percent by weight water based on the total weight of the composition. Oftentimes, a water-soluble or water-miscible humectant is included in the marking composition particularly if the marking composition is to be applied to the marking surface by way of a ball-point pen. The function assigned the humectant is to control dry-out of the marking composition disposed in the clearance between the socket and the rotatable point of the ball-point pen. Suitable humectants include dihydric alcohols such as ethylene, propylene, butylene diol and the like and tri- or higher-hydric alcohols such as glycerine and the like. The amount of humectant included in the marking composition can vary but normally amounts between about 1 to about 20 percent by weight of the composition are suitable. Preferred amounts of humectants are between about 5 to about 15 percent by weight of the composition.

In the practice of the invention, the marking composition is applied to the marking surface, and the water is rapidly removed from the composition by evaporation and/or absorption by the marking surface. Removal of substantially all of the water from the composition is normally complete in about twenty seconds or less. After removal of the water, the erasable coalesced residue provided on the marking surface comprises about 50 percent by weight or more of the polymeric film-forming material with the remainder being colorant and residual amounts of other encapsulated ingredients which may or may not slowly evaporate from the residue with time. Upon substantially complete drying, the erasable residue provides a substantially continuous, substantially water-insoluble film deposited on and removably bonded to the marking surface. The film essentially includes a film-forming polymeric material matrix which coats or encapsulates or otherwise retains the colorant which is uniformly dispersed throughout the matrix. The film can be completely removed from the marking surface by the action of an elastomeric eraser without abrading or otherwise damaging the marking surface carrying the film and without leaving any residual evidence of the film on the surface. Moreover, the film can be completely erased from the surface after an extended period of time such as up to about six months or longer, and new erasable markings can be applied to the portion of the surface from which the film was erased.

While the essential ingredients of marking compositions of the invention are a particulate film-forming polymeric material, colorant(s) and water, the marking compositions of the invention can include other ingredients. For example, the marking composition may include ingredients for controlling or adjusting the rheological properties of the marking composition if needed. Such ingredients may be employed to control leakage of the marking composition from a marking instrument and/or to control flow characteristics of the marking composition as it is applied to the marking surface. Ingredients for controlling rheological properties of the marking composition include thixotropic or gelling agents such as clays, silicas or water-insoluble, water-soluble or water-miscible polymeric binder materials or polymeric shear thinning providing materials such as xanthan gum among others. Xanthan gum is the preferred material for controlling rheological properties, and preferred amounts of xanthan gum are amounts between about 0.05 to about 2 percent by weight of the composition.

Other ingredients, which may be included in the marking compositions of the invention, are antioxidants, corrosion inhibitors, wetting agents and stabilizers, among others. The amount of any of the other above ingredients added to the marking composition can vary and will primarily depend upon the degree of efficacy desired from the added ingredient. However, such amounts can be readily determined by those skilled in the art and will be readily apparent from the following Examples. Illustrative Examples 1-3 below describe marking compositions representative of preferred marking compositions for the erasable systems of the present invention.

EXAMPLE 1

| Ingredient | % By Weight |
|---|---|
| Polymeric film-forming material[1] (solids) | 33.7 |
| Sodium lauryl sulfate | 1.0 |
| Sodium silicate | 1.5 |
| Tetraethylene pentamine | 1.5 |
| Benzotriazole | 0.2 |
| Glycerine | 10.0 |
| Colorant[2] | 1.5 |
| Water | 50.6 |

[1] The polymeric film-forming material was a styrene-isoprene latex having a viscosity of about 30 cps and contained about 40% by weight of a 65:35 isoprene to styrene copolymer. The styrene-isoprene copolymer had a number average molecular weight of about 100,000 or greater and a weight average molecular weight of about 120,000 or greater.

[2] The colorant used in this Example and in Example 2 was a commercially available, substantially water-insoluble pigment sold under the tradename COLANYL BLUE A2R by American Hoechst.

The marking compositions of Examples 1, 2 and 3 were prepared by first adding all the ingredients except the colorant to the latex while the latex is stirred with a magnetic stirrer and then adding the colorant. The mixture of ingredients was stirred for about 10 minutes and then filtered through a 7 micron filter pad.

The average particle diameter of the particles of the styrene-isoprene polymer dispersed in the above marking composition was about 0.11 microns.

EXAMPLE 2

| Ingredient | % By Weight |
|---|---|
| Polymeric film-forming material[3] (solids) | 60.8 |
| Potassium oleate | 2.0 |
| Benzotriazole | 0.2 |
| Glycerine | 5.0 |
| Ethylene glycol | 5.0 |
| Pigment[2] | 1.5 |
| Water | 25.92 |

[2] The colorant used in this Example and in Example 2 was a commercially available, substantially water-insoluble pigment sold under the tradename COLANYL BLUE A2R by American Hoechst.

[3] The polymeric film-forming material was a commerically available styrene-butadiene latex containing 70% by weight styrene-butadiene and is sold under the tradename PLIOLITE 3757 by Goodyear Tire and Rubber Company.

The average particle diameter of the particles of styrene-butadiene dispersed in the marking composition was about 0.102 microns.

EXAMPLE 3

| Ingredient | % By Weight |
|---|---|
| Polymeric film-forming material[4] (solids) | 43.3 |
| Surfactant (TRITON X-100) | 2.0 |
| Dipropylene glycol | 5.0 |
| Glycerine | 5.0 |
| Benzotriazole | 0.2 |
| Colorant[5] (3% aqueous solution) | 1.2 |
| Water | 43.3 |

[4] The polymeric film-forming material was a commercially available carboxylated acrylonitrile-butadiene latex containing 50% by weight carboxylated acrylonitrile-butadiene and is sold under the tradename CHEMIGUM LCG 520 by Goodyear Tire and Rubber Company.

[5] The colorant used was a commercially available, 3% aqueous solution of a cationic dye sold under the tradename CRYSTAL VIOLET by BASF Wyandotte Corporation.

Unlike the colorants of Examples 1 and 2, the colorant of this Example was initially water soluble but was rendered substantially water insoluble by interaction of the cationic dye with the polymeric film-forming material. The average particle size of the particles of carboxylated acrylonitrile-butadiene dispersed in the above marking composition was about 0.17 microns.

Additional details relating to suitable erasable marking compositions for erasable systems of the invention can be found in commonly owned U.S. Pat. No. 4,297,260 issued Oct. 27, 1981, to William I. Ferrie. Jr.

Illustrative Example 4 describes erasable systems representative of the systems of the present invention.

| Marking Composition | Average Particle Diameter (microns) | Marking Element | Average Surface Pore Diameter (microns) | Ratio of Average Surface Pore Size to Average Particle Size |
|---|---|---|---|---|
| Example 1 | 0.11 | IKONOREX MATT DULL | 0.612 | 5.6 |
| Example 2 | 0.102 | IKONOREX MATT DULL | 0.612 | 6.0 |
| Example 3 | 0.17 | IKONOREX MATT DULL | 0.612 | 3.6 |

The marking compositions of Examples 1 2 and 3 were each applied to a marking element of Example 4 by way of a ball-point pen. Each marking composition dried in twenty seconds or less and provided a marking comprising a continuous, coalesced residue or film which was easily legible and had substantially uniform color, dimensions and line quality. The films provided by each marking composition had excellent rub resistance and could not be removed or erased from the marking surface by accidental rubbing such as might occur by rubbing another marking element against the film or by lightly rubbing the film with a cloth. However, the film could be completely erased by an elastomeric eraser without leaving any residual visible evidence of the erased marking and without any damage to the surface carrying the marking. Moreover, films of each marking composition could be completely erased from the surface by an elastomeric eraser after six months, and the film provided by the marking composition of Example 1 could be completely erased after 8 months.

In the broadest aspects of the invention's use, the size and shape of the marking element can vary over a wide range, and the marking composition can be applied to the surface of the marking in any suitable manner. For example, the marking composition can be applied to the surface by a brush, pen or even by the fingers if desired. For about two weeks after the marking composition has been applied to the surface, the film providing the marking can be completely removed or erased from the surface by the use of an elastomeric eraser or by energetic rubbing of the film with a dry cloth or paper or a dry brush or sponge. The intensity of the rubbing needed to remove the film by a cloth or paper or brush or sponge increases with the time the film remains on the marking surface. Within the first two or three hours after the film is applied to the surface, the intensity of rubbing needed is relatively mild, but after a few hours, the intensity of rubbing needed progressively increases. After about one week, complete removal or erasure of the film is most effectively achieved by the use of an elastomeric eraser.

In the preferred aspects of the invention, the erasable system is used to provide office paraphernalia such as daily calendars or appointment books. When used in such applications, the marking element of the system can take the form of a book including a plurality of pages of marking elements bound between covers with each page having blocks or lines and other printed indicia all arranged and integrated in a manner designed to effectively record information needed by the user. In this preferred application, the marking composition is stored in a conventional ball-point pen which includes an elastomeric eraser so that cancelled appointments or schedules can be erased and be replaced by other appointments or schedules. Preferably, means such as magnets or clips are used to retain the ball-point pen in close proximity to the calendar or appointment or schedule book.

From the above description, it should be apparent that the invention presents to the art novel, improved erasable systems having an especially desirable combination of performance characteristics. The combination of performance characteristics provides a wide latitude of applications for the erasable systems. They can be used as effective substitutes for blackboards since the marking composition provides erasable markings which can be completely removed by rubbing with a cloth or brush within a short time after the application of the marking. Alternatively, the markings can be erased by an elastomeric erasure after an extended period of time such as up to about six months or longer. The erasable systems are especially adaptable for use as office paraphernalia such as appointment books or daily calendars. In such applications, the marking composition is included in a ball-point pen, and the marking element takes the form of pages of a book. The individual user can easily write needed information on selected areas of the pages and later can easily and completely remove written information from selected areas of the page and substitute other information in the selected area without affecting information in other areas of the page. Accordingly, the novel, improved erasable systems of the present invention provide distinctive, unexpected advantages and benefits over erasable systems known to the art at the time the present invention was made.

We claim:

1. An erasable system comprising a marking element and a marking composition for applying markings to the element, said marking element providing a porous marking surface having an average surface pore diameter between about 0.05 to about 1.0 microns, said marking composition comprising an aqueous dispersion of particles of a film-forming polymeric material having an average particle diameter between about 0.04 to about 0.5 microns and a colorant, said marking composition providing an erasable, coalesced residue on drying which is substantially water insoluble, and where the ratio of the average surface pore diameter of the porous surface to the average particle diameter of the polymeric material is less than about 20.

2. A system of claim 1 where the ratio is less than about 10.

3. A system of claim 2, where the polymeric material is a film-forming, polymeric material selected from the group consisting of a conjugated diene-containing polymeric material, a styrene-containing polymeric material, an acrylonitrile-containing polymeric material, a carboxylated acrylonitrile-containing polymeric material and mixtures of these.

4. A system of claim 2 where the colorant is substantially water insoluble.

5. A system of claim 2 where the colorant is rendered substantially water insoluble on drying of the marking composition.

6. A system of claim 2 where the amount of polymeric material in the marking composition is between about 3 to about 70 percent by weight based on the total weight of the composition.

7. A system of claim 6 where the amount of polymeric material is between about 10 to about 60 percent by weight.

8. A system of claim 2 where the amount of colorant is between about 0.1 to about 40 percent by weight.

9. A system of claim 8 where the amount of colorant is between about 0.3 to about 15 percent by weight.

10. A system of claim 2 where the average particle diameter is between about 0.05 to about 0.30 microns.

11. A system of claim 2 where the erasable marking composition is retained in a ball-point pen.

12. A system of claim 1 wherein said marking element comprises a plurality of superposed sheets bound in the form of a book.

13. An erasable system comprising a marking element and a marking composition for applying markings to the element, said marking element providing a porous marking surface having an average surface pore diameter between about 0.05 to about 1.0 microns and comprising a fibrous or paper substrate which has been coated with or immersed in a material to reduce the original average surface pore diameter of the porous surface, said marking composition comprising an aqueous dispersion of particles of a film-forming polymeric material having an average particle diameter between about 0.04 to about 0.5 microns and a colorant, said marking composition providing an erasable, coalesced residue on drying which is substantially water insoluble, and where the ratio of the average surface pore diameter of the porous surface to the average particle diameter of the polymeric material is less than about 20.

14. A system of claim 13 wherein said marking element comprises a plurality of superposed sheets bound in the form of a book.

15. A system of claim 13 wherein said ratio is less than about 10.

16. A marking element comprising a plurality of superposed paper sheets bound in the form of a book, each sheet providing a porous paper surface having an average surface pore diameter between about 0.05 to about 1.0 microns and carrying a dry, substantially water-insoluble, erasable, coalesced residue provided by a marking composition comprising an aqueous dispersion of particles of a film-forming polymeric material having an average particle diameter between about 0.04 to about 0.5 microns and a colorant and where the ratio of the average pore size of the porous surface to the average particle size of the polymeric material of the dispersion is less than about 20.

17. A marking element of claim 16 where the ratio is less than about 10 and each sheet has been coated with or immersed in a material to reduce the original average surface pore diameter of the porous surface.

18. A marking element of claim 17 where the residue includes a polymeric material selected from the group consisting of a conjugated diene-containing polymeric material, a styrene-containing polymeric material, an acrylonitrile-containing polymeric material, a carboxylated acrylonitrile-containing polymeric material and mixtures of these.

19. A marking element of claim 17 where the average surface pore diameter is between about 0.05 to about 0.75.

* * * * *

UNITED STATES PATENT AND TRADEMARK OFFICE
CERTIFICATE OF CORRECTION

PATENT NO. : 5,217,255

DATED : June 8, 1993

INVENTOR(S) : Nan J. Lin and Peter G. Hanley

It is certified that error appears in the above-identified patent and that said Letters Patent is hereby corrected as shown below:

Col. 5, line 64, change "Physical" to --physical--.

Col. 7, delete lines 65-67,

Signed and Sealed this

Seventeenth Day of January, 1995

Attest:

Bruce Lehman

BRUCE LEHMAN

*Attesting Officer*

*Commissioner of Patents and Trademarks*